United States Patent [19]

Ledeen et al.

[11] Patent Number: 4,542,814
[45] Date of Patent: Sep. 24, 1985

[54] SYSTEM FOR PRECISE VALVE CONTROL

[75] Inventors: Howard L. Ledeen, Flintridge; Chander P. Mittal, Rowland Heights, both of Calif.

[73] Assignee: Ledeem Flow Control Systems, Inc., Sun Valley, Calif.

[21] Appl. No.: 537,517

[22] Filed: Sep. 30, 1983

[51] Int. Cl.⁴ .............. B60K 41/22; F16D 23/12; F16D 47/00

[52] U.S. Cl. .............. 192/0.098; 192/48.92; 192/51; 192/87.18; 74/128; 74/142; 74/425; 251/248

[58] Field of Search .......... 74/128, 142, 425; 192/0.096, 0.098, 48.1, 48.8, 48.9, 48.92, 51, 87.14, 87.15, 87.16, 87.18, 87.19; 251/58, 133, 248

[56] References Cited

U.S. PATENT DOCUMENTS

| | | | |
|---|---|---|---|
| 2,430,627 | 11/1947 | Westbrook | 192/48.9 X |
| 2,505,260 | 4/1950 | Stevens | 192/0.098 |
| 3,078,733 | 2/1963 | Emery | 74/128 |
| 3,203,266 | 8/1965 | Willis et al. | 74/128 |
| 3,854,561 | 12/1974 | Conde | 192/48.92 |
| 4,223,770 | 9/1980 | Kranz | 192/0.098 X |

FOREIGN PATENT DOCUMENTS 0070422 6/1977 Japan ................. 251/58

Primary Examiner—Tony M. Argenbright
Assistant Examiner—W. R. Wolfe
Attorney, Agent, or Firm—Melvin R. Stidham

[57] ABSTRACT

A system for precise positioning of a fluid control valve including a reciprocating piston at each end of a worm shaft, each to rotate the worm shaft in one direction only, through a scotch yoke and a rotary drive transmission. Selection of a valve determines which rotary drive is operated and a hydraulic piston clutch is engaged each time a particular drive is activated and remains engaged to hold a selected position.

8 Claims, 1 Drawing Figure

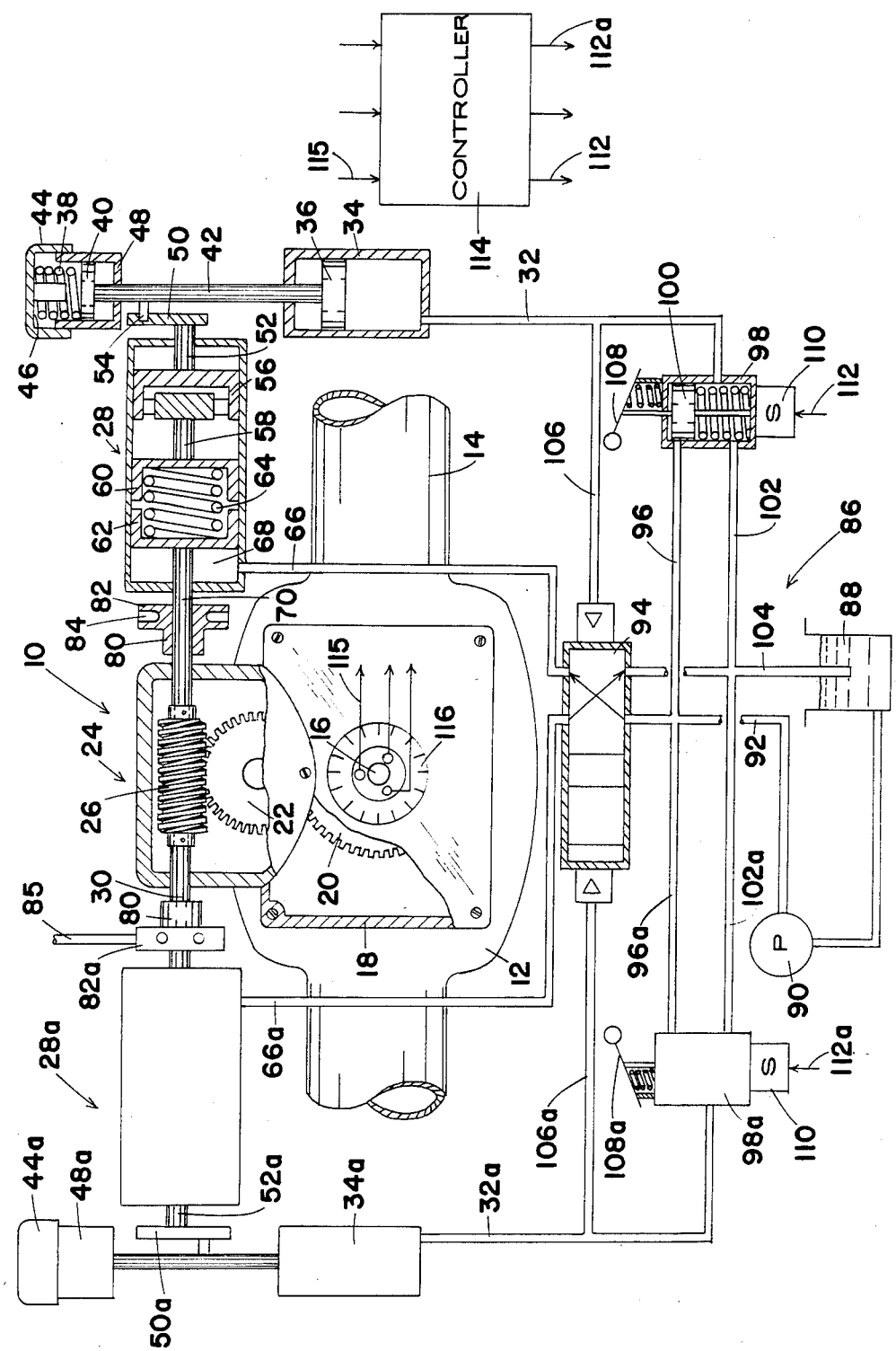

4,542,814

SYSTEM FOR PRECISE VALVE CONTROL

BACKGROUND OF THE INVENTION

Many conventional valve devices such as plug valves, ball valves, butterfly valves and control type valves can be made to perform as high rangeability, adjustable flow restrictors. To accomplish this the control element must be moved through its travel very precisely. Currently available valve positioning devices achieve accuracies of ±0.5% of full travel and even ±0.25% can be achieved. Such accuracies, however, are not sufficient to accomplish high rangeabilities of flow control. There are increasing requirements for flow rangeabilities which exceed 1000:1 and there is of course an attraction to utilizing conventional valves of proven design for such applications. There is, therefore, a need to position such valves more precisely. In order to achieve such rangeabilities it is necessary to control positioning to accuracies of ±0.25%. Such high degree of accuracy in positioning is required because the control element of a conventional valve is proportioned to allow high flow through a pipe sized passage. Conversely however, when the control element works close to the fully closed position, the slightest movement has a great effect on flow. The higher gain which is experienced in the low flow regions generally makes the conventional type valve unsatisfactory for control of low flow and therefore limits the control rangeability. If effective flow control is to be achieved in the zones of low flow the valve element must be moved in very small increments or steps and the capability for making such steps should not restrict the availability of full thrust or torque needed to move the valve element when subjected to maximum loads.

OBJECT OF THE INVENTION

It is an object of this invention to provide a system for precise positioning of a control valve.

It is a further object of this invention to provide a valve actuator that can move a control valve in a selected direction in precise increments of movement.

It is a further object of this invention to provide a valve actuator that can move a valve in precise, adjustable increments.

It is a further object of this invention to provide a valve actuator that can position a valve precisely and hold it in its fixed position.

Other objects and advantages of this invention will become apparent from the description to follow, particularly when read in conjunction with the accompanying drawing.

SUMMARY OF THE INVENTION

In carrying out this invention, there is provided a gear train to rotate the stem of a valve and move it to selected positions between its open and closed positions. The input of the gear train is a worm that is rotated in opposite directions by rotary transmission means splined to opposite ends of the worm shaft. Each rotary transmission is driven in one direction through an incremental drive device, by means of a reciprocating piston with spring return. The length of piston stroke can be closely adjusted. Selection of one piston drive by operation of an appropriate valve, positions a direction switch valve which engages a piston-actuated clutch in the rotary transmission associated with it so that only one rotary transmission actively engages the worm shaft at all times.

BRIEF DESCRIPTION OF THE DRAWINGS

The drawing is a schematic illustration of the precise position control of this invention.

DESCRIPTION OF A PREFERRED EMBODIMENT

Referring now to the drawing with greater particularity, the precise position control device 10 of this invention is shown mounted on a valve 12, which is installed in a pipeline 14. The valve 12 may be of any conventional type, such as a globe valve, ball valve, plug valve, butterfly valve or gate valve, which is operated by rotation of a shaft or stem 16. In any event, mounted on the valve 12 is a gear box 18 carrying a gear train 20 which, in turn, is driven by the output worm gear 22 of a worm gear assembly 24.

The input worm 26 is adapted to be driven in either direction by rotary transmission means 28 and 28a. As will be described, each transmission 28 and 28a rotates the worm shaft 30 in one direction only and the direction of rotation is determined by the particular transmission 28 or 28a which is activated. This system will be described by reference to only one of the separate drives, and the same reference numbers will be used to identify like components of the other drive, though with the letter "a" added to designate the components of transmission 28a.

Input to the rotary drive 28 is delivered in small, adjustable increments by means of a pressure fluid, hydraulic or pneumatic, which is delivered through a transfer duct 32 to a cylinder 34 to drive a piston 36 through a measured stroke. After completion of the stroke, a return spring 38 acting against a push member 40 carried on the other end of the piston rod 42, returns the piston 36 to its start position, ready for another stroke. Some suitable means such as a cap 44 with an abutment 46 engagable by the pusher member 40 may be threaded onto the spring housing 48 for precise adjustment of the piston stroke.

The reciprocal, linear movement of the piston rod 42 is translated into an increment of rotary movement by any suitable means, such as a scotch yoke 50 carried on the input shaft 52 of the rotary transmission 28. The scotch yoke 50 is engaged by a roller 54 carried on the piston rod to turn the scotch yoke 50 and, hence, the shaft 52 through an increment of rotation of say, 10° to 30°.

Included in the rotary transmission is a form of one-way drive device, such as a roller-ramp, one-way clutch device 56 that will transmit rotation from shaft 52 to shaft 58 in one direction only, whereby the return movement of the piston rod 42 by the spring 38 has no effect on the position of the shaft 58. Hence, each complete stroke of the piston 36, forward under pressure and return by spring, results in a small uni-directional increment of rotation.

Also included in the rotary transmission 28 is a suitable clutch device 60, 62, the elements of which are held disengaged by a spring 64. However, the element 62 is a piston unit that is biased into engagement with the element 60 by hydraulic or pneumatic pressure delivered through an actuating duct 66 to pressurize the chamber 68, as will hereinafter be described. The output shaft 70 of the rotary transmission has a splined coupling connection 80 to the worm shaft 30 so that it will remain in driving engagement through the small amount of axial movement necessary to engage the clutch elements 60, 62. Carried on the splined coupling 80 is a wheel 82 including holes 84 that can be engaged by a suitable tool 85 for manual rotation of the worm shaft 30 to override the power drive, same being enabled by the one-way clutch device 56.

The pressure fluid system 86 for actuating the piston controls 36 and 62 may include a liquid reservoir 88, in the case of a hydraulic system, and a pump 90 to pressurize a load duct 92, which is connected both to a directional switch valve device 94 and to a control valve 98. A flow blocking member 100 in the control valve 98 normally prevents flow through branch line 96 from the pressure source 90, while exhausting the cylinder 34 through transfer line 32 and exhaust lines 102 and 104 back to the reservoir 88.

The directional control valve 94 is shifted into either of two positions by pressurizing an actuating duct 106 or 106a, depending upon which valve 98 is opened to flow from a pressure branch line 96. When a particular valve 98 or 98a is opened the switch valve 94 is positioned to enable flow from the pressure source 90 to that piston clutch 62, which is associated with that valve. Once so shifted, the particular clutch 62 will remain engaged as long as there is pressure at the source 90 until the switch valve 94 is shifted by opening the other valve 98a.

In operation, the valves 98 and 98a may be selectively operated by manual means 108. However, in normal use they are signal operated devices, such as solenoid valves 110 operated by electrical signals 112 from a suitable controller 114, which is operative to detect variances from a desired fluid flow condition, such as pressure, rate of flow and the like in the pipeline 14. The signals 112 are operative to energize the solenoids 110 of a particular one of the valves 98 or 98a depending on the direction of rotation of the valve stem 16 desired in order to achieve the desired correction. For example, the controller may determine that five increments of rotation of the worm shaft 30 are necessary to turn the valve 12 to a position to achieve a desired pressure in the pipeline 14. Five electrical signals will be transmitted to the solenoid 110 to actuate the valve 98 five times, each driving the piston 36 to turn the rotary transmission 28 through a precise increment and then allowing the spring 38 to return the piston rod 42 for a return stroke.

In a typical arrangement, the ratio of worm 26 to worm gear 22 may be in the order of seven or eight to one and the ratio of the gear train 20 in the order of two or three to one. Then, with each stroke of the piston 36 producing a stepping action of the worm shaft 30 of 5° to 15°, it can be seen that each stroke of the piston produces a very infinitesimal increment of rotation of the valve stem 16.

As part of the control system, a potentiometer 116 on the stem 16 senses the position of the valve 12 and signals the controller 114 when the valve 12 has moved to the desired position.

While this invention has been described in conjunction with a preferred embodiment thereof, it is obvious that modification and changes therein may be made by those skilled in the art to which it pertains without departing from the spirit and scope of this invention, as defined by the claims appended hereto.

What is claimed as invention is:

1. A system for precise position control of a fluid control valve which is operated by rotary movement of an actuating shaft, said control system comprising:
    rotary motion transmitting means, including an input shaft, for turning said actuating shaft;
    opposing first and second rotary transmission members having output ends thereof connected to opposite ends of said input shaft and input ends to be rotatably driven;
    first and second reciprocable driving means at the input ends of said rotary transmission members;
    interengagable means on each of said driving means and the input end of a rotary transmission member for imparting an increment of rotation to said rotary transmission member in response to a stroke of said driving means in one direction only;
    a pressure-actuated member in each of said driving means operative when pressurized to move said driving means in said one direction;
    biasing means opposing said pressure-actuated member;
    a source of pressure fluid;
    a pair of actuating means, each operative when activated to deliver a pulse of pressure fluid to one of said driving means;
    clutch means in each of said rotary transmission members operative when engaged to transmit rotary motion from said input end thereof;
    energizing means for engaging said clutch means;
    continuous energy supply means connected to said energizing means for activation thereof;
    a two-position switch device in said supply means operative in each of two positions to activate one only of said clutch energizing means; and
    means associated with each of said actuating means for moving said switch device to activate the clutch actuating means associated with said actuating means upon activation of said actuating means.

2. The position control system defined by claim 1 wherein:
    said energy supply means is a conduit from said source of pressure fluid;
    said clutch energizing means is a piston device biased by pressure fluid;
    said switch device is a two position valve means operative in each position to connect one piston device to said source of pressure fluid and the other piston device to exhaust;
    and including:
    opposing pressure members to shift said valve means; and
    shift pressure duct means connected from each of said transfer ducts to one of said pressure members so that said valve means are shifted when one of said valve members is moved to its active position.

3. The position control system defined by claim 1 including:
    a one-way clutch in each of said rotary transmission members.

4. The position control device defined by claim 1 including:
    a handwheel fixed on the output end of said rotary transmission member.

5. The position control system defined by claim 1 including:
    means for adjusting the length of stroke of each of said reciprocating driving means.

6. The position control system defined by claim 1 wherein said rotary motion transmitting means includes:
   a worm on said input shaft; and
   a pinion driven by said worm.

7. The position control system defined by claim 1 wherein said actuating means comprises:
   first and second load ducts connected from said source;
   first and second transfer ducts connected to said first and second driving means, respectively; and
   first and second valve members connected, respectively, to said first and second load ducts;
   each valve member including an exhaust port therein;
   each of said valve members being normally in an idle position wherein it shuts off said load duct and opens said exhaust port, but being movable to an active position wherein it shuts off said exhaust port and opens said load duct.

8. The position control device defined by claim 7 wherein:
   said valve members are moved to said active position in response to a signal delivered thereto;
   and including:
   a controller for delivering signals to a selected one of said valve members to move said control valve in a direction to satisfy a desired flow characteristic.

* * * * *

UNITED STATES PATENT AND TRADEMARK OFFICE
CERTIFICATE OF CORRECTION

PATENT NO. : 4,542,814
DATED : Sept. 24, 1985
INVENTOR(S) : Howard L. Ledeen, et al It is certified that error appears in the above-identified patent and that said Letters Patent is hereby corrected as shown below:

Title page,

The name of the assignee should read --Ledeen Flow Control Systems, Inc.--.

Signed and Sealed this

Seventeenth Day of June 1986

[SEAL]

Attest:

DONALD J. QUIGG

Attesting Officer

Commissioner of Patents and Trademarks